(12) United States Patent
Bendapudi et al.

(10) Patent No.: US 7,409,691 B2
(45) Date of Patent: Aug. 5, 2008

(54) EXTENDING OPERATING SYSTEM SUBSYSTEMS

(75) Inventors: Perraju Bendapudi, Hyderabad (IN);
Rajesh Jalan, Hyderabad (IN);
Siddharth Rana, Hyderabad (IN);
Rohini Krishnan Rajaraman, Dubai (AE)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/003,930

(22) Filed: Dec. 3, 2004

(65) Prior Publication Data
US 2006/0150201 A1 Jul. 6, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................. 719/319
(58) Field of Classification Search .................. 713/319
See application file for complete search history.

(56) References Cited

U.S. PATENT DOCUMENTS

| | | | | |
|---|---|---|---|---|
| 5,619,698 | A * | 4/1997 | Lillich et al. | 717/168 |
| 6,021,272 | A * | 2/2000 | Cahill et al. | 717/147 |
| 6,086,623 | A * | 7/2000 | Broome et al. | 703/26 |
| 6,779,187 | B1 * | 8/2004 | Hammond | 719/331 |
| 2002/0066021 | A1 * | 5/2002 | Chien et al. | 713/200 |
| 2004/0199763 | A1 * | 10/2004 | Freund | 713/154 |
| 2006/0058658 | A1 * | 3/2006 | King et al. | 600/437 |

* cited by examiner

Primary Examiner—Meng-Ai An
Assistant Examiner—KimbleAnn Verdi
(74) Attorney, Agent, or Firm—Perkins Coie LLP (57) ABSTRACT

Techniques for extending operating system subsystems are provided. The techniques involve receiving a library that provides functions that extend an application program interface of the subsystem of the operating system. The techniques dynamically add a set of local procedure call ports or system call numbers corresponding to functions provided by the library and provide a known local procedure call port for receiving requests to identify a dynamically added local procedure call port or system call number. When a function of the library is requested, the subsystem determines the dynamically added port or system call number corresponding to the function, and provides an indication of the determined port or system call number to a requester of the function. The requester of the function may then invoke the function using the indicated dynamically added port or system call number.

17 Claims, 8 Drawing Sheets

| Callbacks Table | | 322 |
|---|---|---|
| IP | Function | ... |
| IP1 | 312 | |
| IP2 | 314 | |
| IP5 | 316 | |
| IP8 | 318 | |

FIG. 4

| Callbacks Table | | | 322 |
|---|---|---|---|
| IP | Flavor | Function | ... |
| IP1 | 312 | LINUX | |
| IP2 | 314 | LINUX | |
| IP5 | 316 | LINUX | |
| IP8 | 318 | LINUX | |
| IP1 | 312 | SCO | |
| IP8 | 318 | SCO | |

EXTENDING OPERATING SYSTEM SUBSYSTEMS

TECHNICAL FIELD

The described technology relates generally to operating systems and, more particularly, to extending operating system subsystems.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may provide functionality to application programs using subsystems. A subsystem is an operating system component that implements an operating system's application program interfaces ("APIs"). A subsystem generally provides APIs relating to a specific implementation of the operating system.

Multiple implementations of operating systems may exist. As an example, the UNIX operating system has a variety of implementations including, e.g., POSIX, BSD, LINUX, SCO, XENIX, SOLARIS, and others. These implementations may be referred to as "flavors" of UNIX. An API relating to a flavor of UNIX may be different than an API relating to another flavor of UNIX. As an example, a command available in one flavor may be unavailable in the other flavor. Furthermore, although a command is available in both flavors, a result of the command may be different in the flavors. Thus, an application designed for a flavor of UNIX may function in an unexpected manner when used on another flavor of UNIX. When an administrator attempts to migrate a complex application from a flavor of UNIX, such as BSD, to another flavor of UNIX, such as POSIX, the application may behave unexpectedly.

One approach to changing a flavor of an operating system is to modify the operating system, such as by modifying a subsystem of the operating system. For example, a POSIX subsystem may be modified to emulate another flavor of UNIX. However, this could lead to multiple incompatible versions of an operating system. Furthermore, customers of such modified operating systems may be unable to receive benefits of using a standard operating system, such as commonly employed tools, robust testing, or having a dependable supplier of the operating system. It would thus be highly desirable to provide a facility for extending operating system subsystems without requiring modification of the operating system subsystems.

DETAILED DESCRIPTION

Techniques for extending operating system subsystems are provided. In various embodiments, an operating system may provide a facility to extend functionality provided by a subsystem by enabling functions that extend the operating system to be called at various points of the subsystem's standard processing. These various points may be referred to as "insertion points." As an example, a vendor of an operating system flavor may indicate that some steps are to be performed before the operating system opens any file ("pre-steps") and some other steps are to be performed after the operating system opens the file ("post-steps"). The pre- and post-steps may include steps that the subsystem does not generally perform when the operating system subsystem has not been extended. Then, when the subsystem receives a command to open a file, the subsystem may first cause the pre-steps to be performed, then would perform steps it generally performs when the operating system subsystem has not been extended ("standard-steps"), and then may cause the post-steps to be performed. A dynamic link library ("DLL") implementing an interface recognized by the subsystem may provide functions having the pre-, post-, and other steps. These functions may provide a return value to the subsystem, such as an instruction not to perform the standard-steps. The DLL may also provide a table comprising a list of the functions that the DLL implements. The subsystem may read the table and use entries in the table to determine when to execute functions of the DLL. As an example, the table may indicate a function having pre-steps for an open command and a function having post-steps for a close command. Then, when the subsystem receives a command to open a file, it may cause the pre-function to be performed, and may then perform the standard-steps relating to the open command. When the subsystem receives a command to close the file, it may cause the standard-steps relating to the close command to be performed and then may perform the post-steps. Thus, operating system subsystems can be extended by providing an associated DLL that implements an API recognized by the subsystem for performing pre- and post-steps relating to commands of the operating system.

In various embodiments, an operating system subsystem may provide an operating system flavor by having a statically linked library and a dynamically linked library ("DLL") that communicate with one another to extend functionality provided by the operating system. The statically linked library may provide an API relating to the extended functionality. The operating system may be extended, e.g., to provide an additional API. The subsystem may load the DLL, which implements methods of the additional API. When loading the DLL, the subsystem may add a local procedure call ("LPC") port for each method implemented by the DLL. Because the ports are added dynamically at runtime (e.g., when loading the DLL), other components of the operating system may be unable to make LPCs relating to the methods corresponding to these ports because these components would not know which port number corresponds to a given API method. The statically linked library facilitates selection of the correct port. An application needing to use the extended functionality could link with the statically linked library to request and receive the extended functionality identified by the API. A method of the statically linked library may communicate with the operating system subsystem, such as by invoking a local procedure call to a known port of the subsystem, to request a port relating to the API as implemented in the DLL. The method corresponding to the known port identifies the port corresponding to the requested method of the API and routes further requests to the identified port. In various embodiments, the method corresponding to the known port may provide an identification of the requested method of the API to the component that called the method at the known port. Thus, APIs provided by operating system subsystems can be extended.

In various embodiments, the subsystem may use a table for system call numbers that the subsystem adds dynamically. The subsystem may add a system call number dynamically for each method implemented by the DLL. Because the subsystem adds the system call numbers dynamically at runtime (e.g., when loading the DLL), other components of the operating system may be unable to make LPCs relating to the methods corresponding to these system call numbers because these components would not know which system call number corresponds to a given API method. The statically linked library facilitates selection of the correct system call number. An application needing to use the extended functionality could link with the statically linked library to request and receive the extended functionality identified by the API. A method of the statically linked library may communicate with the operating system subsystem, such as by invoking a local procedure call to a known port of the subsystem, to request system call number relating to the API as implemented in the DLL. The method corresponding to the known port identifies the system call number corresponding to the requested method of the API and routes further requests to the method identified by the system call number. In various embodiments, the method corresponding to the known port may provide an identification of the requested method of the API to the component that called the method at the known port, and so the method corresponding to the known port may not need to perform further routing. Thus, APIs provided by operating system subsystems can be extended.

Figure 1:
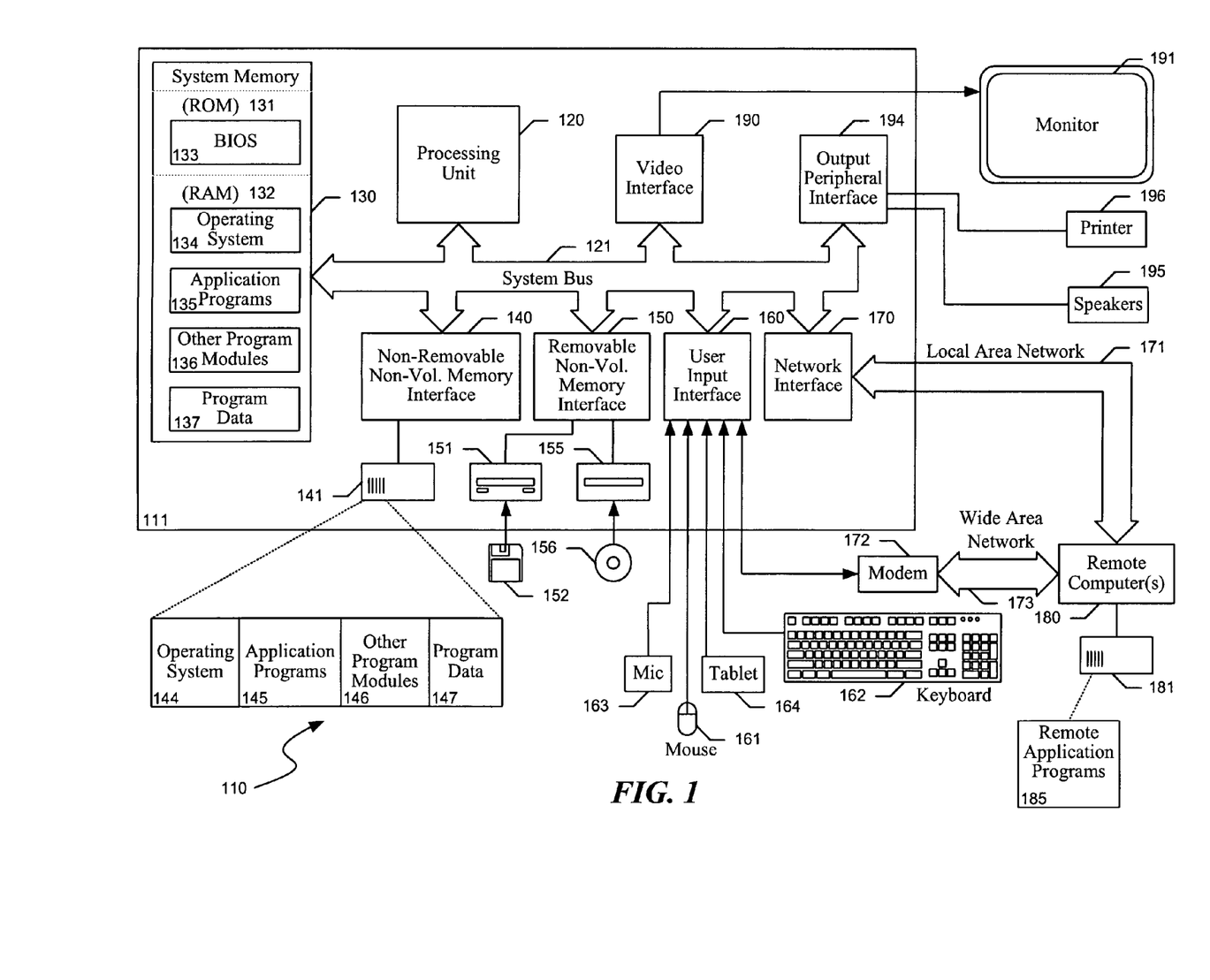
FIG. 1 is a block diagram illustrating an example of a suitable computing environment in which the techniques may be implemented.

Turning now to the figures, FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
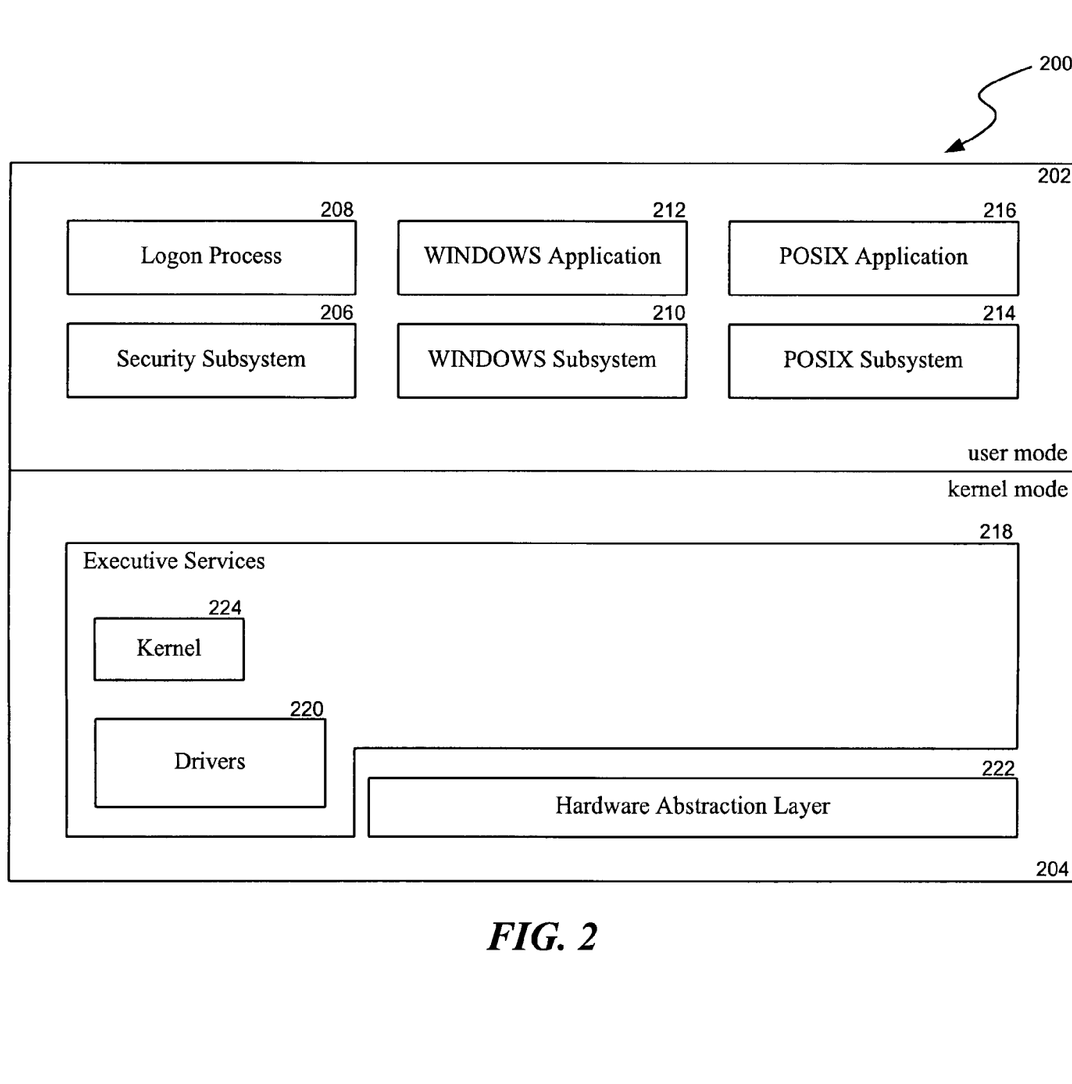
FIG. 2 is a block diagram illustrating components of an operating system.

FIG. 2 is a block diagram illustrating components of an operating system. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to applications and the operating system. As an example, the security subsystem may provide a logon process 208 and functionality to enable users to log on to the operating system.

The WINDOWS subsystem may provide MICROSOFT WINDOWS functionality to applications, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

When an operating system comprises multiple subsystems, it is capable of providing multiple varieties of operating systems, such as MICROSOFT WINDOWS and POSIX. Thus, applications designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Although applications are shown as a part of the operating system, they may execute by utilizing various facilities provided by the operating system, as illustrated in FIG. 1.

Figure 3:
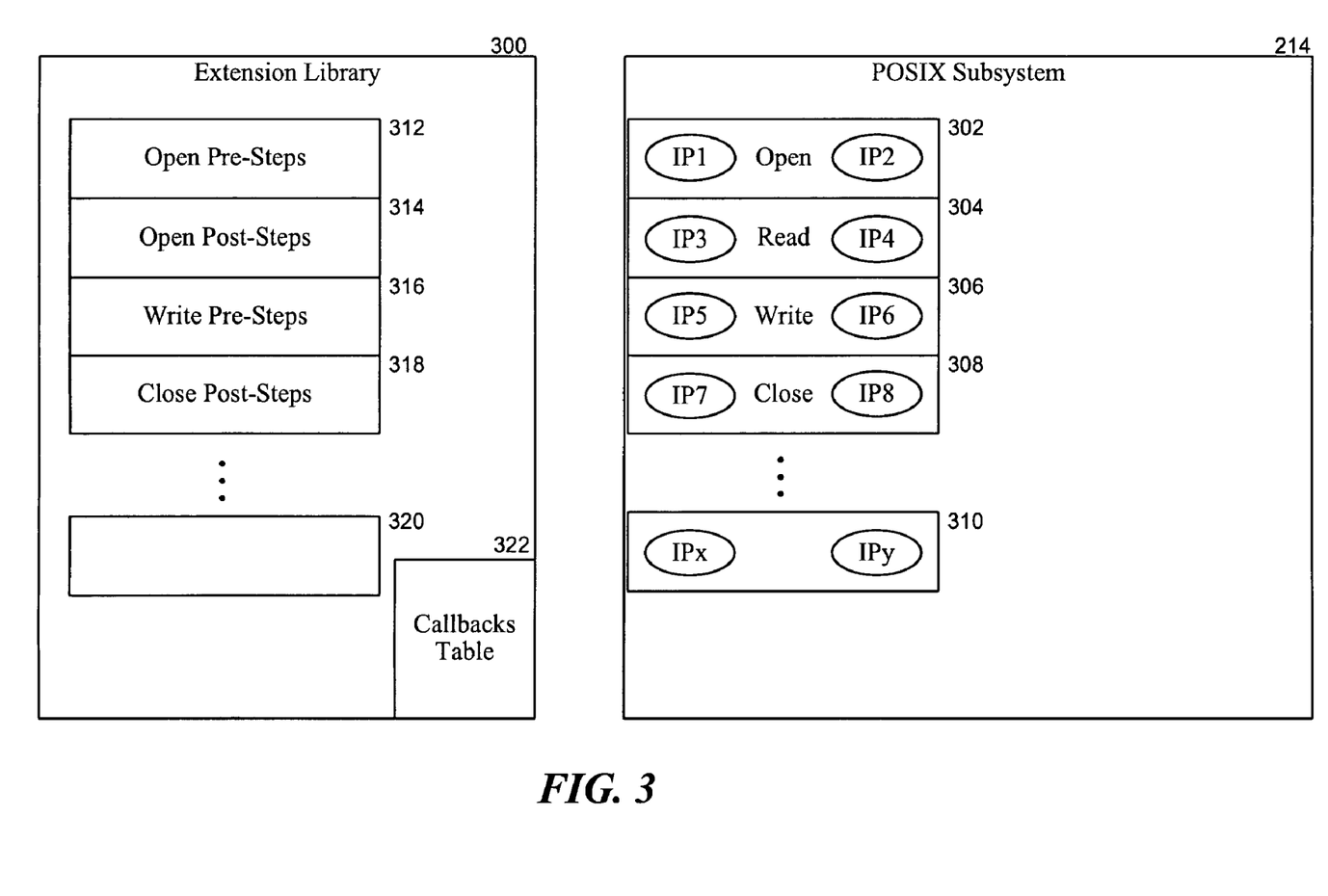
FIG. 3 is a block diagram illustrating components of the subsystem and an extension library for implementing callback functions in an embodiment.

FIG. 3 is a block diagram illustrating components of the subsystem and an extension library for implementing callback functions in an embodiment. In the illustrated embodiment, the POSIX subsystem provides multiple methods relating to its API, such as open 302, read 304, write 306, close 308, and others 310. These methods may implement commands provided to the subsystem.

Each method may have one or more insertion points ("IPs"). As an example, each illustrated method has two IPs: open has IP1 and IP2; read has IP3 and IP4; write has IP5 and IP6; close has IP7 and IP8, and so on. Each insertion point identifies a point in the subsystem's processing at which extension functions may be provided. As an example, IP1 may identify a point prior to the subsystem's regular processing of an open command and IP2 may identify a point subsequent to the subsystem's regular processing of the open command. Insertion points may be added anywhere in a subsystem's program logic, and not necessarily in methods that implement commands.

Insertion points may be associated with functions provided by an extension library 300. The extension library may be loaded by the subsystem when an administrator indicates to provide a particular flavor for the operating system. As an example, the administrator may issue a "loadmodule" command to the subsystem and may indicate the extension library. Upon receiving the loadmodule command, the subsystem may load the extension library. The extension library may be, e.g., a DLL.

The subsystem may retrieve a callbacks table 322 from the extension library. The callbacks table may provide an association between insertion points of the subsystem and functions provided by the extension library. The callbacks table is described in further detail below with reference to FIGS. 4 and 5.

The extension library may further comprise various functions, such as open pre-steps 312, open post-steps 314, write pre-steps 316, close post-steps 318, and other functions 320. The open pre-steps may provide program logic to be performed prior to the subsystem's regular processing of an open command. The open post-steps may provide program logic to be performed subsequent to the subsystem's regular processing of the open command. The write pre-steps may provide program logic to be performed prior to the subsystem's regular processing of a write command. The close post-steps may provide program logic to be performed subsequent to the subsystem's regular processing of the close command.

A flavor of an operating system may need to provide additional semantics relating to opening a file. As an example, a particularly secure operating system may need to decrypt an encrypted file when the file is opened. Alternatively, the operating system may need to check access permissions for a file in a manner different than the operating system provides. Thus, the open pre-steps function may be used to decrypt the encrypted file or check access permissions. If these operations fail, the open pre-steps function may return an indication of the failure.

When processing of the subsystem reaches an IP, the subsystem may check the callbacks table to determine whether a function relating to the IP is in the extension library. When a function relating to the IP is in the extension library, the subsystem may temporarily transfer control flow to the function of the extension library, such as by invoking the function. As an example, when IP1 is reached, the subsystem may invoke the open pre-steps function 312. The invoked function may provide additional logic that the subsystem performs. The subsystem may also transfer various parameters relating to its state to the function. Alternatively, the function may have access to various memory locations or variables associated with the subsystem from which it can determine the subsystem's state.

The invoked function may provide a return value. As an example, the invoked function may indicate whether there was a failure in the function, whether the subsystem should skip its regular processing of the command that caused the subsystem to invoke the function, and so on. The subsystem may, thus, perform its regular processing based on the return value provided by the invoked function. As an example, if the open pre-steps function determines that a user should not be able to open a file, the subsystem may discontinue the open operation.

Figure 4:
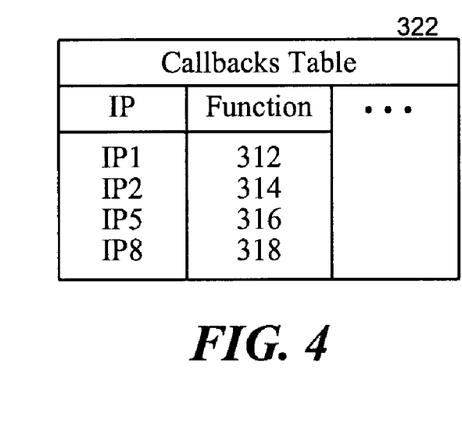
FIGS. 4-5 are block diagrams illustrating a callbacks table of FIG. 3 in various embodiments.
Figure 5:
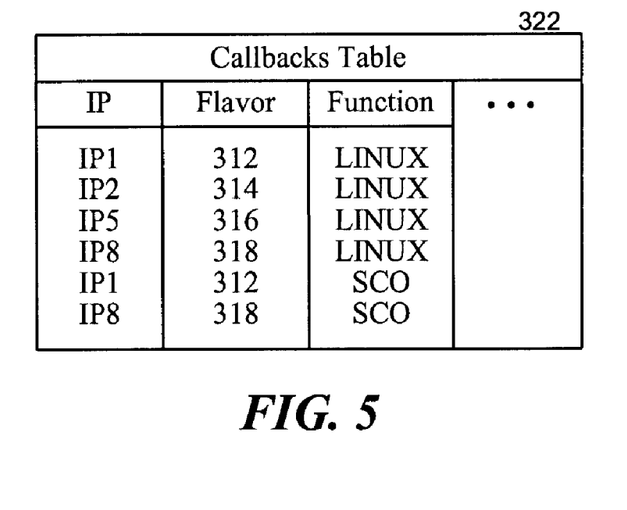

FIGS. 4-5 are block diagrams illustrating the callbacks table of FIG. 3 in various embodiments.

In the embodiment illustrated in FIG. 4, the callbacks table comprises an IP column and a function column. The IP column may list a set of IPs. The function column may identify a function associated with an IP. A function may be associated with multiple IPs. As an example, the callbacks table may have a row indicating that IP1 is associated with an open pre-steps function. The callbacks table may comprise additional columns, such as an indication of parameters, and so on.

The callbacks table may specify different behavior for different operating system flavors. In the embodiment illustrated in FIG. 5, the callbacks table comprises an IP column, flavor column, and a function column. The IP column may list a set of IPs. The flavor column may list a flavor of the operating system to be provided. The function column may identify a function associated with an IP. As an example, the callbacks table may have a row indicating that IP1 is associated with function 1 when a LINUX flavor is to be provided, but with function 2 when a SOLARIS flavor is to be provided.

A function may be associated with multiple IPs and flavors. The table may comprise additional columns, such as an indication of parameters, and so on.

Figure 6:
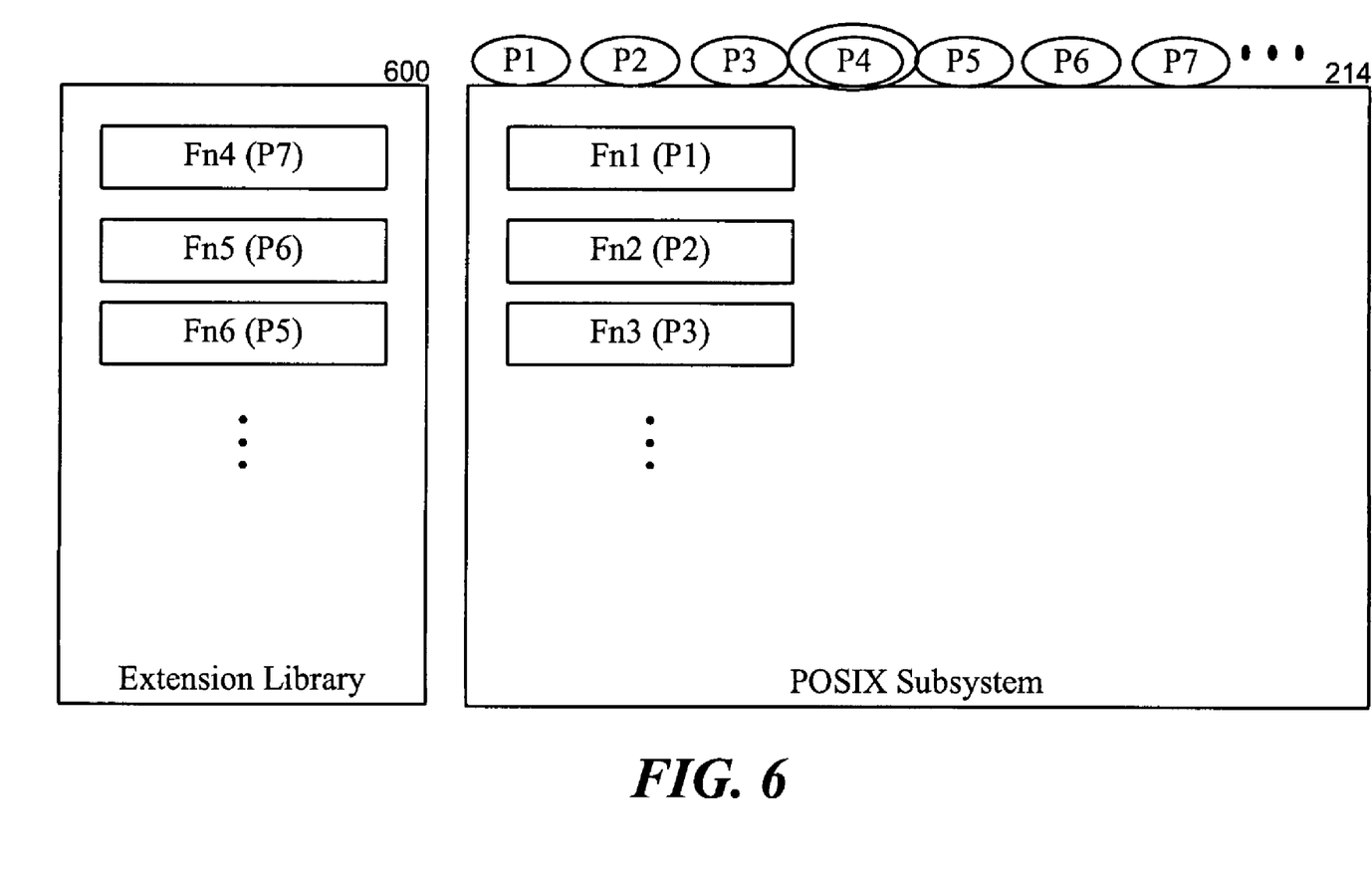
FIG. 6 is a block diagram illustrating components of the subsystem and an extension library for providing extension functions in an embodiment.

FIG. 6 is a block diagram illustrating components of the subsystem and an extension library for providing extension functions in an embodiment. The illustrated embodiment adds an extension library 600 to an operating system. The extension library provides extension functions and may be associated with a subsystem, such as the POSIX subsystem 214. The extension library may be a DLL that is loaded by the subsystem, e.g., upon an indication received by an administrator.

The subsystem may have multiple ports for receiving LPCs: P1, P2, P3, P4, P5, P6, P7, and so on. The ports may generally be associated with functions provided by the subsystem. As an example, P1, P2, and P3 may be associated with function 1, function 2, and function 3 (Fn1, Fn2, and Fn3 in the illustration), respectively.

In various embodiments, the subsystem may have a known port (not shown), and functions provided by the subsystem may be associated with system call numbers (P1, P2, P3, and so on). As an example, system call numbers P1, P2, and P3 may be associated with function 1, function 2, and function 3.

Figure 7:
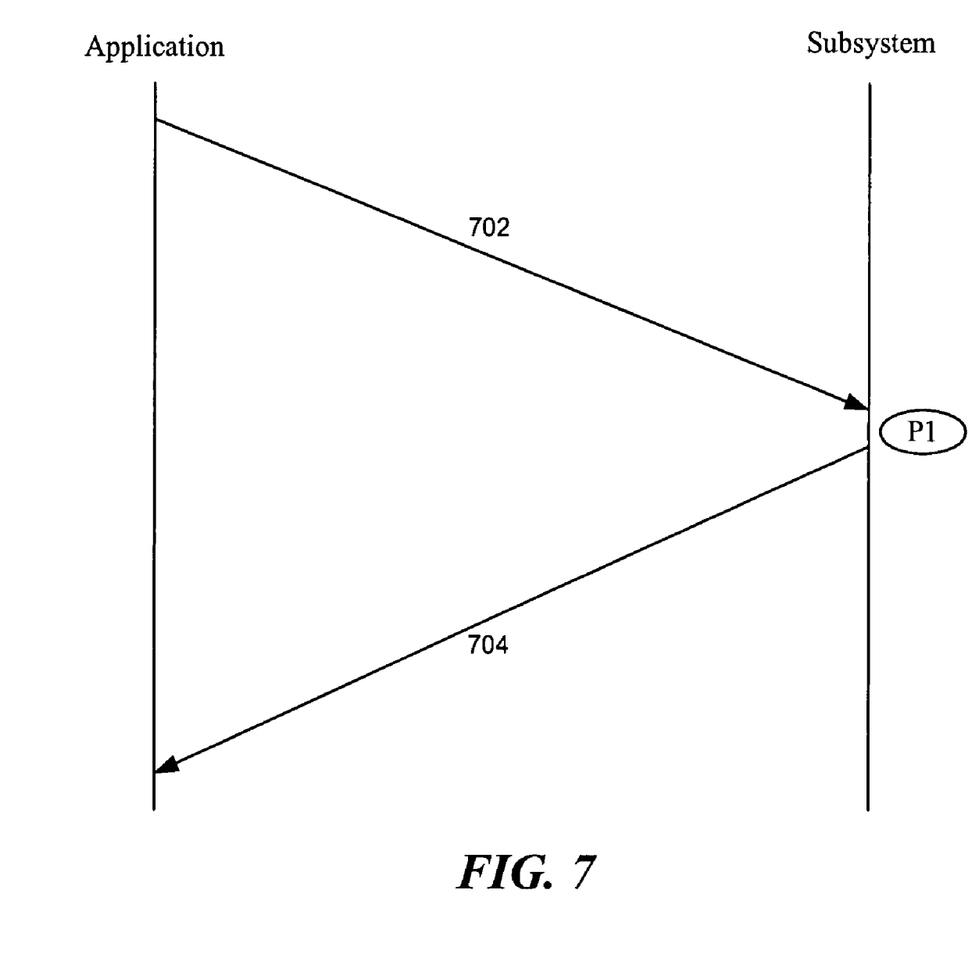
FIG. 7 is a call flow diagram illustrating a call flow when an extension library is not utilized.

FIG. 7 illustrates an example of an LPC flow when an application uses a function provided by the subsystem. The application uses function 1 by sending a request as an LPC 702 to port P1. The subsystem, upon processing the request, sends a response as a response message 704.

In various embodiments, the application may send a request as an LPC 702 to a known port identifying a known system call number, P1. As an example, P1 may be associated with function 1 of the subsystem.

When a subsystem provides additional functions, e.g., by extending its API, the subsystem may dynamically add more ports associated with the additional functions. However, because the ports are added dynamically, an application that invokes a function of the extended API may be unable to determine which port to send an LPC to. Thus, again with reference to FIG. 6, the system provides a "known port," P4, that the application could query to determine which port corresponds to a function that the application may use. In the illustrated embodiment, ports P5, P6, and P7 correspond to functions 6, 5, and 4 (Fn4, Fn5, and Fn6 in the figure), respectively.

In various embodiments, when a subsystem provides additional functions, e.g., by extending its API, the subsystem may dynamically add system call numbers associated with the additional functions. However, because the system call numbers are added dynamically, an application that invokes a function of the extended API may be unable to determine which system call number to use. Thus, the subsystem may use a dynamically updated system call table (shown in FIG. 9) that the subsystem may use to determine which system call number corresponds to a function that the application may use. In the illustrated embodiment, system call numbers P5, P6, and P7 correspond to functions 6, 5, and 4 (Fn4, Fn5, and Fn6 in the figure), respectively.

Figure 8:
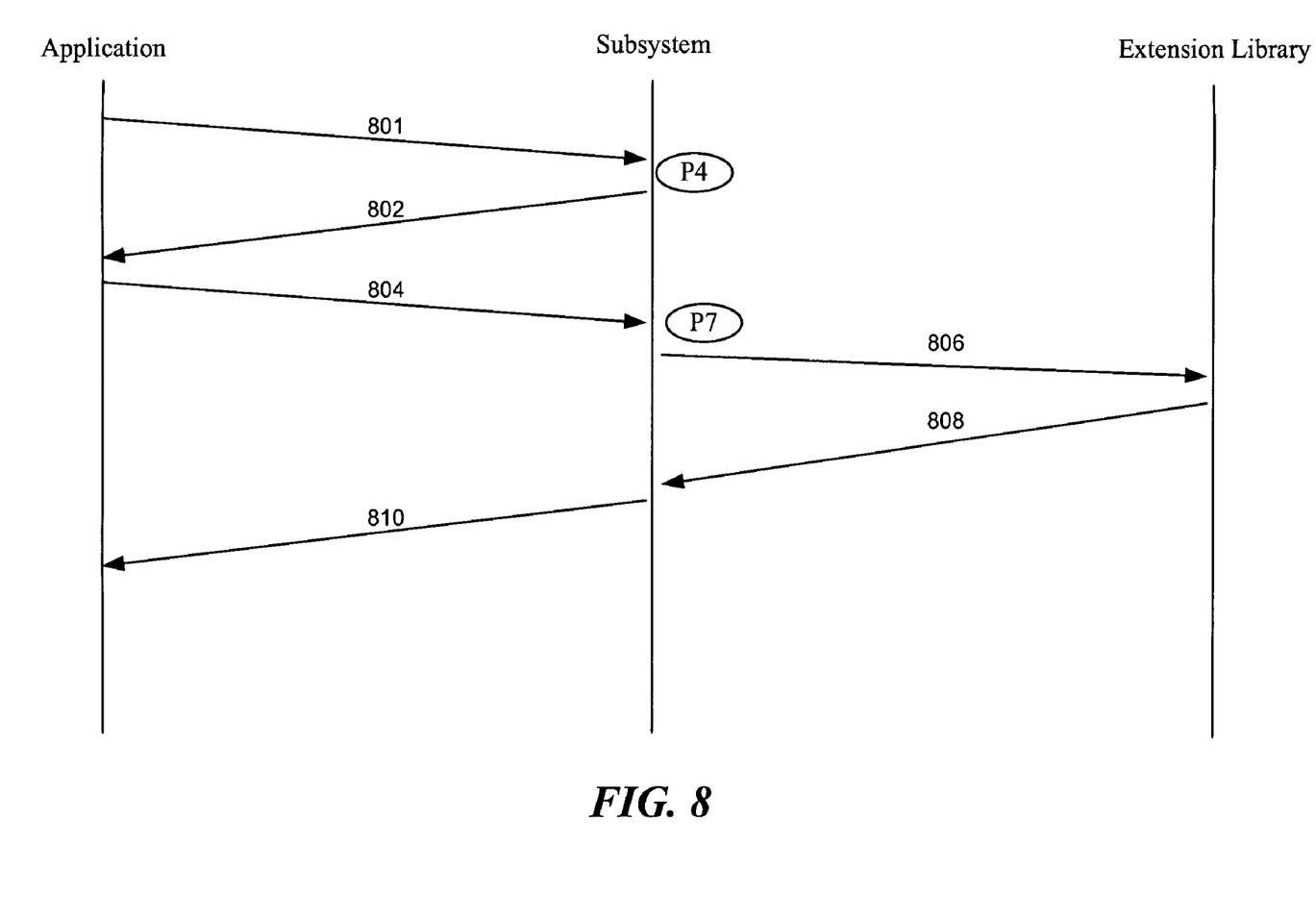
FIG. 8 is a call flow diagram illustrating a call flow when an extension library is utilized.

FIG. 8 illustrates an example of an LPC flow when an application uses an extension function. The application sends a request as an LPC 801 to known port P4. The request may comprise an indication of a function that the application will invoke.

The subsystem may respond with an indication of a port corresponding to the indicated function, such as port P7, in a response message 802. The subsystem may dynamically track ports that correspond to new functions added by extension libraries. Thus, the subsystem may be able to provide ports corresponding to functions of the extension library.

The application may then send an LPC 804 to the port indicated by the subsystem, e.g., port P7, to invoke the function.

The subsystem, upon receiving an LPC at this dynamically added port, may invoke the associated function of the extension library by making a call 806. A return value from the function of the extension library may be received by the subsystem, such as return value 808.

The subsystem may then provide an indication 810 of the return value as a response to the LPC 804.

Thus, the application is able to invoke a function of the subsystem that is dynamically added.

An application may link with a statically linked library or load a DLL that sends an LPC to the known port (not shown). When the application invokes a method of the extended API, the implementation of the method in the library that is loaded or linked by the application may send the LPC to the known port. The method may then send an LPC to the port identified by the subsystem as corresponding to the method.

In various embodiments, the ports may be dynamically added by the subsystem when a function is requested by an application. In various embodiments, ports may be dynamically added by the subsystem when an extension library is loaded.

In various embodiments, an extension library providing functions for extending an API may not be the same as an extension library that provides functions associated with IPs.

In various embodiments, the application sends a request as an LPC 801 to known port and system call number. The request may comprise an indication of a function that the application will invoke.

Figure 9:
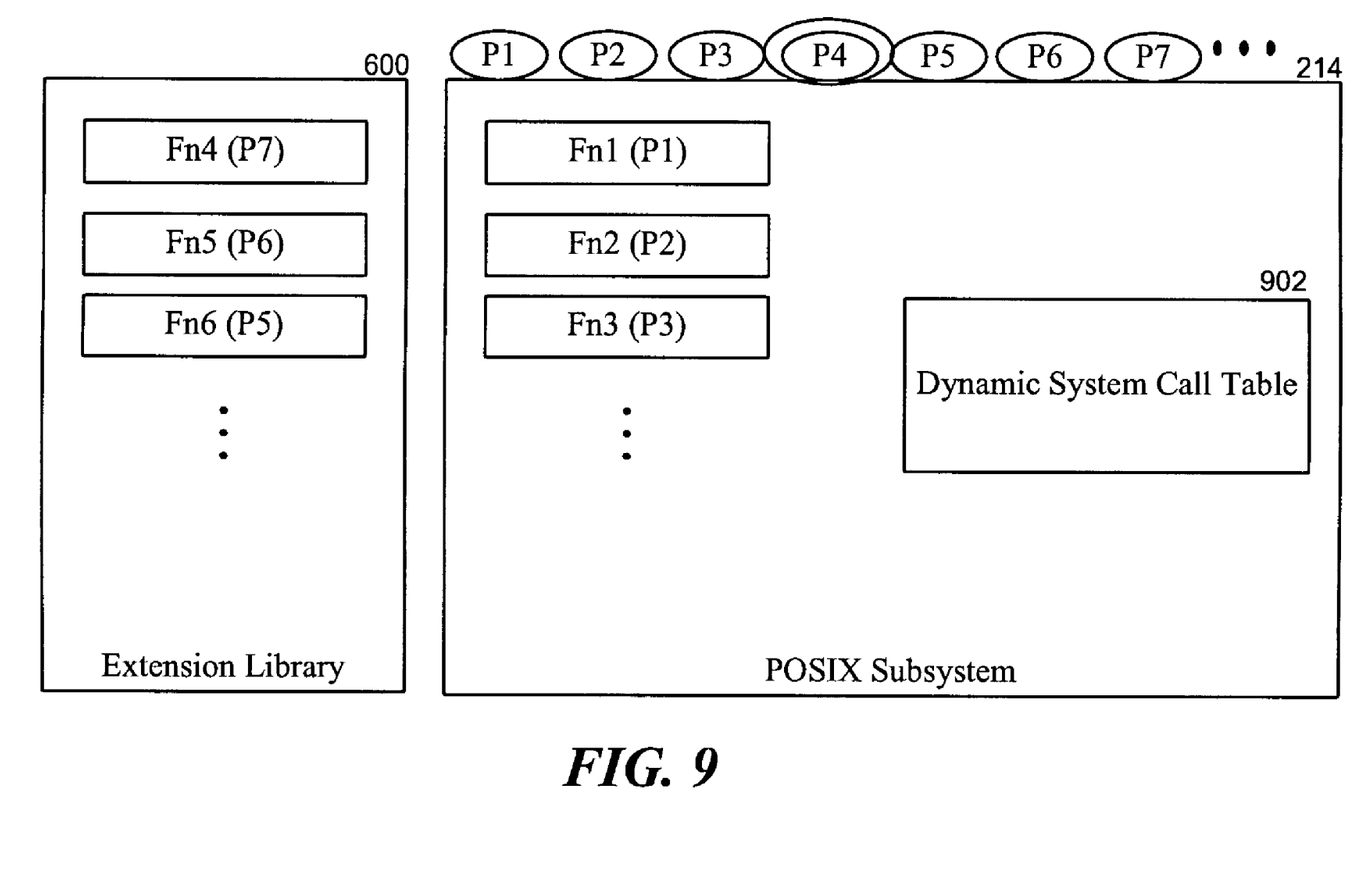
FIG. 9 is a block diagram illustrating components of the subsystem, an extension library for providing extension functions in an embodiment, and a dynamic system call table.

The subsystem may respond with an indication of a system call number corresponding to the indicated function, such as system call number P7, in a response message 802. The subsystem may dynamically track system call numbers that correspond to new functions added by extension libraries, such as in a dynamic system call table, as illustrated in FIG. 9 and discussed in further detail below. Thus, the subsystem may be able to provide system call numbers corresponding to functions of the extension library.

The application may then send an LPC 804 to the known port indicated identifying the provided system call number, e.g., P7, to invoke the function.

The subsystem, upon receiving an LPC identifying this dynamically added system call number, may invoke the associated function of the extension library by making a call 806 to a function of the extension library. A return value from the function of the extension library may be received by the subsystem, such as return value 808.

The subsystem may then provide an indication 810 of the return value as a response to the LPC 804.

In various embodiments, once the subsystem identifies a system call number, the application may not need to query for the system call number again.

Thus, the application is able to invoke a function of the subsystem that is dynamically added.

An application may link with a statically linked library or load a DLL that sends an LPC to the known port having the known system call number (not shown). When the application invokes a method of the extended API, the implementation of the method in the library that is loaded or linked by the application may send the LPC to the known port identifying the known system call number, and may receive a system call number relating to the method of the extended API. The method may then send an LPC identifying the system call number it received.

In various embodiments, the subsystem may dynamically add system call numbers, e.g., to the dynamic system call table of FIG. 9, when an application requests a function. In various embodiments, the subsystem may dynamically add system call numbers when it loads an extension library.

In various embodiments, an extension library providing functions for extending an API may not be the same as an extension library that provides functions associated with IPs.

FIG. 9 is a block diagram illustrating components of the subsystem, an extension library for providing extension functions in an embodiment, and a dynamic system call table.

The dynamic system call table 902 comprises associations between dynamically added system call numbers and functions provided by the extension library 600. The dynamic system call table may provide a level of indirection to functions that extend the API of the operating system by enabling a request for a function to be routed to functions identified in the dynamic system call table. The subsystem may populate the dynamic system call table, e.g., when it loads an extension library or an application requests a function.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for extending a subsystem of an operating system, comprising:
   a processor;
   a library that provides functions to the subsystem of the operating system, the functions comprising program logic for extending the subsystem of the operating system, the functions providing extensions to an application program interface of the subsystem of the operating system;
   a known port of the subsystem of the operating system, the known port for receiving a request for a function provided by the library and sending an indication of a location at which the function may be accessed; and
   a set of locations associated with the subsystem of the operating system, the set of locations including at least a subset of the set of locations that the subsystem of the operating system adds dynamically to associate functions provided by the library, wherein the locations are ports of the subsystem of the operating system, upon receiving a local procedure call at the known port, determines which of the subset of the set of ports corresponds to a function requested in the local procedure call and provides an indication of the determined port to a requester that originated the local procedure call.

2. The system of claim 1 wherein the subsystem of the operating system complies with a portable operating system interface specification.

3. The system of claim 1 wherein the locations are ports and the subsystem tracks a correspondence with ports that are dynamically added when the library is loaded.

4. The system of claim 1 wherein the locations are rows of a dynamic system call table associated with system call numbers and the subsystem tracks a correspondence with system call numbers that are dynamically added when the library is loaded.

5. The system of claim 1 wherein the library is dynamically loaded by the subsystem of the operating system.

6. The system of claim 1 wherein the locations are rows of a dynamic system call table associated with system call numbers and the subsystem of the operating system dynamically adds the subset of the set of system call numbers to the dynamic system call table when it loads the library.

7. A system for extending a subsystem of an operating system, comprising:
   a processor;
   a library that provides functions to the subsystem of the operating system, the functions comprising program logic for extending the subsystem of the operating system, the functions providing extensions to an application program interface of the subsystem of the operating system;
   a known port of the subsystem of the operating system, the known port for receiving a request for a function provided by the library and sending an indication of a location at which the function may be accessed; and
   a set of locations associated with the subsystem of the operating system, the set of locations including at least a subset of the set of locations that the subsystem of the operating system adds dynamically to associate functions provided by the library, wherein the locations are rows of a dynamic system call table associated with system call numbers and the subsystem of the operating system, upon receiving a local procedure call at the known port, determines which of the subset of the system call numbers corresponds to a function requested in the local procedure call and provides an indication of the determined system call number to a requester that originated the local procedure call.

8. A method performed by a computer system for extending an application program interface of a subsystem of an operating system, the subsystem of the operating system having a set of locations associated with functions of the application program interface, the method comprising:
   receiving a library that provides functions for extending the application program interface of the subsystem of the operating system;
   adding dynamically a set of locations corresponding to functions provided by the library;
   providing a known local procedure call port, the known local procedure call port for receiving requests to identify a dynamically added location from the set of dynamically added locations;
   receiving a request to identify a dynamically added location corresponding to a function, the request to identify a dynamically added location received at the known local procedure call port and indicating the function;
   determining a dynamically added location corresponding to the function indicated in the request to identify a dynamically added location;
   providing the determined dynamically added location;
   receiving a request to perform an action, the action generally associated with the subsystem of the operating system, the action received at the provided dynamically added location; and
   invoking the function of the library corresponding to the action.

9. The method of claim 8 including providing an operating system flavor by utilizing functions of the library.

10. A computer-readable storage medium storing computer-executable instructions executed by a processor to perform a method of extending a subsystem of an operating system, the subsystem of the operating system having an application program interface, the method comprising:

receiving a library that provides functions for extending the application program interface of the subsystem of the operating system;

adding dynamically a set of locations corresponding to functions provided by the library;

providing a known local procedure call port, the known procedure call port for receiving requests to identify a dynamically added location from the set of dynamically added locations;

receiving a request to identify a dynamically added location corresponding to a function, the request to identify a dynamically added location received at the known local procedure call port and indicating the function;

identifying a dynamically added location corresponding to the function indicated in the request to identify a dynamically added location; and providing the identified dynamically added location.

11. The computer-readable storage medium of claim 10 wherein the subsystem of the operating system complies with a portable operating system interface specification.

12. The computer-readable storage medium of claim 10 wherein the location is a local procedure call port.

13. The computer-readable storage medium of claim 10 wherein the location is a row of a dynamic system call table associated with a system call number.

14. The computer-readable storage medium of claim 10 including:

receiving a request to perform an action, the action generally associated with the subsystem of the operating system, the action identifying the dynamically added location; and invoking the function of the library corresponding to the action.

15. The computer-readable storage medium of claim 10 wherein an application requests to perform the action.

16. The computer-readable storage medium of claim 15 wherein the application utilizes an application library having a function that corresponds to a function that is added by the library that the subsystem of the operating system receives, the function of the application library for sending requests to the known local procedure call port.

17. The computer-readable storage medium of claim 10 comprising:

determining a first dynamically added location corresponding to the function indicated in the request to identify a dynamically added location;

providing the first dynamically added location;

upon re-loading the received library, determining a second dynamically added location corresponding to the function indicated in the request to identify a dynamically added location; and providing the second dynamically added location.

* * * * *